United States Patent [19]

Minka

[11] 4,010,716
[45] Mar. 8, 1977

[54] ROTARY ENGINE

[76] Inventor: Karlis Minka, 204 E. Joppa Road, Towson, Md. 21204

[22] Filed: July 12, 1974

[21] Appl. No.: 487,968

[52] U.S. Cl. .............................. 123/8.47; 418/36; 418/101; 418/121; 418/122
[51] Int. Cl.² ...................................... F02B 53/04
[58] Field of Search ............ 123/8.47; 418/101, 36, 418/121, 122

[56] References Cited

UNITED STATES PATENTS

| | | | |
|---|---|---|---|
| 1,485,591 | 3/1924 | Bullington | 418/101 |
| 1,778,182 | 10/1930 | Bullington | 123/8.47 |
| 1,946,136 | 2/1934 | Farley | 123/8.47 |
| 2,103,632 | 12/1937 | Nichols | 418/101 X |
| 2,503,894 | 4/1950 | Wildhaber | 418/36 |
| 3,280,803 | 10/1966 | Sabet | 123/8.47 |
| 3,294,071 | 12/1966 | Turco | 418/36 X |
| 3,304,921 | 2/1967 | Prochazka | 418/36 X |
| 3,381,669 | 5/1968 | Tschudi | 123/8.47 |
| 3,430,573 | 3/1969 | Groeger | 418/36 |
| 3,463,128 | 8/1969 | Spinnett | 123/8.47 |
| 3,565,049 | 2/1971 | Bauer | 123/8.47 |
| 3,599,611 | 8/1971 | Staat | 123/8.47 |
| 3,645,239 | 2/1972 | Cena | 123/8.47 |
| 3,769,946 | 11/1973 | Scherrer | 123/8.47 |

FOREIGN PATENTS OR APPLICATIONS

| | | | |
|---|---|---|---|
| 753,930 | 10/1933 | France | 418/36 |

*Primary Examiner*—Clarence R. Gordon

[57] ABSTRACT

The invention pertains to a rotary machine embodying as major elements a dual rotor consisting of two rotor halves rotating in a circular housing and an oscillator comprised of a cascade of elliptical gears. The periphery of the housing is adapted, with respect to intake, outlet and other necessary means, to suit the purpose for which the machine is intended. The dual rotor has an even number of vanes shaped to best suit the purpose of the machine. Half of the vanes are located on each rotor half in such a manner as to be able to rotate with the rotor halves in the circular housing and to oscillate with respect to each other creating working chambers of varying volume while rotating in the same direction. The oscillations are imposed by the oscillator which includes an input-output shaft integrated with a pair of elliptical gears in the center of the cascade. The space between the dual rotor and the housing and between the respective rotor parts is sealed by a suitable sealing system.

To provide cooling of the dual rotor in applications where it is necessary, the dual rotor is equipped with two coaxial fans which circulate air through the housing and the parts to be cooled.

The machine, with a suitable arrangement of intake and exhaust ports and other means, is used in applications involving varying working chambers such as an internal combustion engine, steam engine, fluid motor, pump or compressor. It can be constructed in multi-unit arrangements.

16 Claims, 23 Drawing Figures

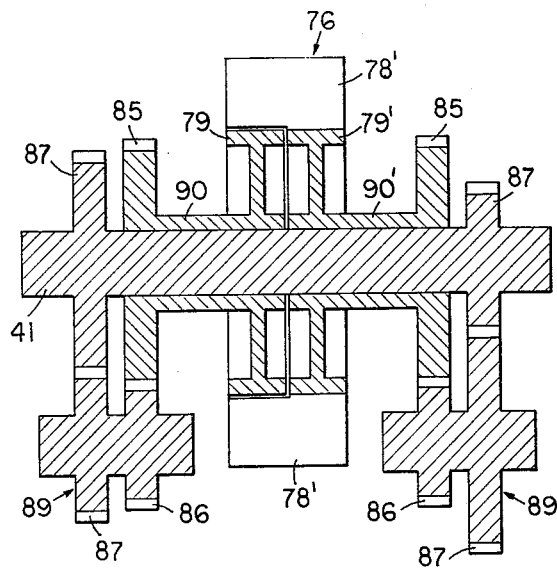
FIG. 17
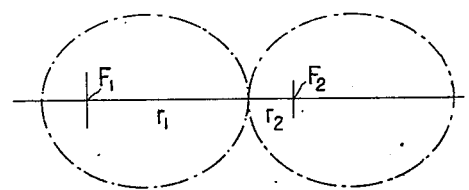
FIG. 19
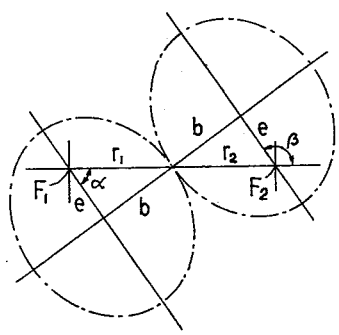
FIG. 18
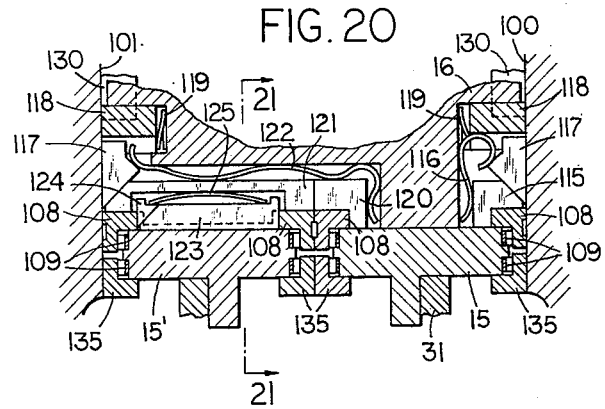
FIG. 20
FIG. 21
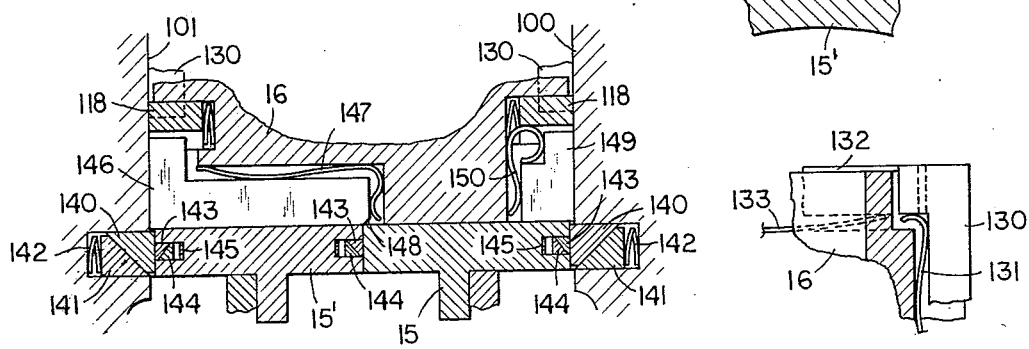
FIG. 23
FIG. 22

ROTARY ENGINE

CROSS REFERENCE TO A RELATED APPLICATION

The disclosure of Disclosure Document No. 029524, filed Mar. 15, 1974, in the U.S. Patent Office is incorporated herein.

BACKGROUND OF THE INVENTION

Previous rotary engines generally related to the type described in this disclosure may be classified as either curved cylindrical piston or radiating piston type engines. Both types, and particularly the radiating piston type engines, have a rather inefficient combustion chamber with a large surface to volume ratio casing large amounts of unburned hydrocarbon emissions. They also make it difficult to obtain a sufficient range of ignition timing because of the shape of the combustion chamber and the resulting restriction of the location of the ignition means. Furthermore, the curved cylindrical piston type engines are difficult and expensive to manufacture.

The state of the prior art may be ascertained by reference to U.S. Pat. No. 1,298,838 of H. L. Weed; U.S. Pat. No. 3,034,486 of H. L. Buxton; U.S. Pat. No. 3,203,405 of H, Sabet; U.S. Pat. No. 3,302,625 of K. G. Cunningham; and U.S. Pat. No. 3,769,946 of W. A. Scherrer.

U.S. Pat. No. 1,298,838 discloses an internal combustion engine which employs a torus shaped housing accommodating two pairs of pistons, each pair attached to a rotor half. The oscillation of the pistons is accomplished by a mechanism having two two-lobe eccentric gears, four single lobe eccentric gears and six circular gears. However, the arrangement is not practical because it requires very large eccentricity for the single lobe eccentric gears to achieve sufficient amplitude of oscillation. Consequently, the single lobe gears are subject to large variations of loads, a condition which is compounded by the limited space available on the single lobe gears to accommodate a journal or a shaft of sufficient diameter. The output shaft rotates at twice the velocity of the rotor.

The twelve piston rotary engine disclosed in U.S. Pat. No. 3,034,486 employs four oval gears to obtain six oscillations per revolution of the pistons located in a torus shaped housing. The four oval gears are accommodated in a stationary hub of the rotor and transmit the oscillations to the pistons by means of two circular gears and two internal ring gears. In this type of arrangement, the diameters of the oval gears and the maximum diameter of the output shaft are determined entirely by the engine hub radius and not by strength requirements. The output shaft rotates at three times the angular velocity of the rotor.

U.S. Pat. No. 3,203,405 discloses an internal combustion engine employing two pairs of vanes in a drum shaped housing, wherein the relative oscillating motion of the vanes is obtained by an arrangement of three meshing elliptical gears, two circular planetary gears and an internal gear rim. Two of the elliptical gears are planetary gears, engaged with a centrally located elliptical gear. The planetary elliptical gears are integrated with the circular planetary gears and located on a rotating box-like hollow disc. One of the oscillating vane shafts also performs the function of the output shaft which would rotate with a fluctuating angular velocity and therefore requires a large flywheel mass. The sector type vanes radiate directly from the rotor shafts and therefore are subject to high stresses due to the small base area.

The oscillating motion of two pairs of curved pistons disclosed in U.S. Pat. No. 3,302,625 is obtained by a substantially elliptical gear, two eccentrically mounted circular gears and three conventional circular gears. To achieve a sufficient amplitude of oscillation, two of the circular gears in this arrangement should be mounted at high eccentricity causing the same difficulty experienced by the single lobe eccentric gears of U.S. Pat. No. 1,298,838 discussed hereinabove. In addition, output is obtained from one of the oscillating rotor shafts.

U.S. Pat. No. 3,769,946 discloses rotary engines having a number of gear arrangements to obtain oscillation of the pistons. The first embodiment shows an arrangement of four two-lobe elliptical gears, which is also employed in U.S. Pat. No. 3,034,486. One of the other embodiments, employing six two-lobe gears, however, produces no oscillations of the pistons. The embodiments employing a combination of elliptical and circular gears on the power shaft produce generally, an oscillating output rotation, because both pistons have to oscillate so that the moments of inertia forces will be in dynamic equilibrium in accordance with Newton's Third Law. The radiating type pistons have the same disadvantage as those in U.S. Pat. No. 3,203,405. The large concentration of mass at the periphery of the pistons is particularly disadvantageous because of the inertia loads generated by the oscillation of the radiating type pistons.

SUMMARY OF THE INVENTION

Because the internal combustion engine, due to the severe operating requirements, presents some of the most difficult problems, the specification of the present invention mainly is concerned with the use of the invention in internal combustion engines. It is apparent, however, that the invention is not limited to this specific application, but is applicable to most mechanical processes involving a varying working chamber.

Some of the most important requirements for an internal combustion engine are high efficiency, minimum emissions, durability, easy manufacturability, small size and weight, and minimum noise and vibrations. The object of this invention is an improvement with respect to these requirements over the reciprocating and other rotary type engines.

The construction principle of this invention allows, to a considerable extent, the independent optimization of the combustion chamber for maximum thermal efficiency and reduced emissions. The combustion chamber is formed without the restrictions imposed by engine kinematics and the presence of valves. Turbulence in the charge is controlled by the size and form of a squish area. Further, the shape of the vanes contributes to increase the volumetric efficiency by reducing intake losses. The absence of valves has a similar effect. In addition to shafts, bearings and seals, the only other major machine elements used in the invention are gears which have high mechanical efficiency.

Durability of the engine is influenced favorably by the pure circular motion of a cooled dual rotor in a simple circular housing, relatively few major parts, and favorable operating conditions for the seals as it becomes apparent hereinafter in the detailed description of the invention.

Manufacturing of the elliptical gears may be accomplished economically by numerically controlled gear shapers. The engine may be assembled, to a large extent, by automation techniques because of simple construction, relatively few parts and other construction features.

The internal combustion engine configuration equipped with four vanes has four complete cycles per revolution; each cycle consisting of four strokes; intake, compression, expansion and exhaust. Thus the engine is equivalent to an eight cylinder reciprocating piston engine, the equivalent cylinder space being only about one-quarter of that of the reciprocating engine. A reduction of size is also accomplished regarding the rest of the engine with a corresponding decrease in weight.

The polar moments of inertia of each oscillating half of the engine are made to be the same, thus eliminating any unbalanced masses and consequent torsional vibrations. Since there is no reciprocating motion, there are no higher order harmonic vibrations due to this cause. Pulsating loads on the dual rotor bearings of the four vane engine are eliminated by increasing the number of vanes to eight. The working strokes then occur symmetrically on opposite sides of the dual rotor housing and, therefore, the bearings experience no loads due to the working pressures.

Distributing the combustion process by increasing the number of cycles per revolution reduces noise output. The elimination of the valve system and the absence of motion reversal (present in reciprocating engines), and the absence of a reversal of the direction of centrifugal forces (present on apex seals in most eccentric rotor type engines), consequently reduces engine noise. Properly meshed and lubricated gears produce little noise.

With respect to previous oscillating piston or vane type engines a particular object of this invention, in addition to the optimization of the combustion chamber and the vanes, is a construction resulting in adequate cooling of the vanes and the interior of the engine, significantly decreased moments of inertia forces and stresses experienced by the vanes and other oscillating elements, and adequate ignition timing range. A further object is to increase obtainable gear ratios thereby maximizing the volume of the working chambers and to reduce loads on the oscillator gears by introducing new gear arrangements. Another object is to produce multi-unit configurations of the invention and to achieve adequate sealing of the working chambers. Further objects and advantages of the invention will be apparent in the description, the claims and the drawings.

BRIEF DESCRIPTION OF THE DRAWINGS

The invention may best be described by reference to the appended drawings showing embodiments of the present invention, wherein:

FIG. 17 is a diagrammatic longitudinal sectional view of an alternate arrangement of the elements of FIGS. 14 and 15;

FIG. 18 is a diagrammatic view of two meshed single lobe elliptical gears representing the oscillator;

FIG. 19 is a view of the gears shown in FIG. 18 in a different position;

FIG. 20 is an enlarged sectional view of a part of the dual rotor looking along 20—20 of FIG. 5, showing the seals;

FIG. 21 is a sectional view of the seals looking along 21—21 of FIG. 20;

FIG. 22 is an enlarged view looking along 22—22 of FIG. 4; and

FIG. 23 is an enlarged sectional view of an alternate seal construction for the same view of the machine shown in FIG. 20.

DESCRIPTION OF THE PREFERRED EMBODIMENTS

The following detailed description is mainly concerned with the use of the invention in internal combustion engines, however, the invention is not restricted to this application, as it will be apparent to those skilled in the art.

Figure 2:
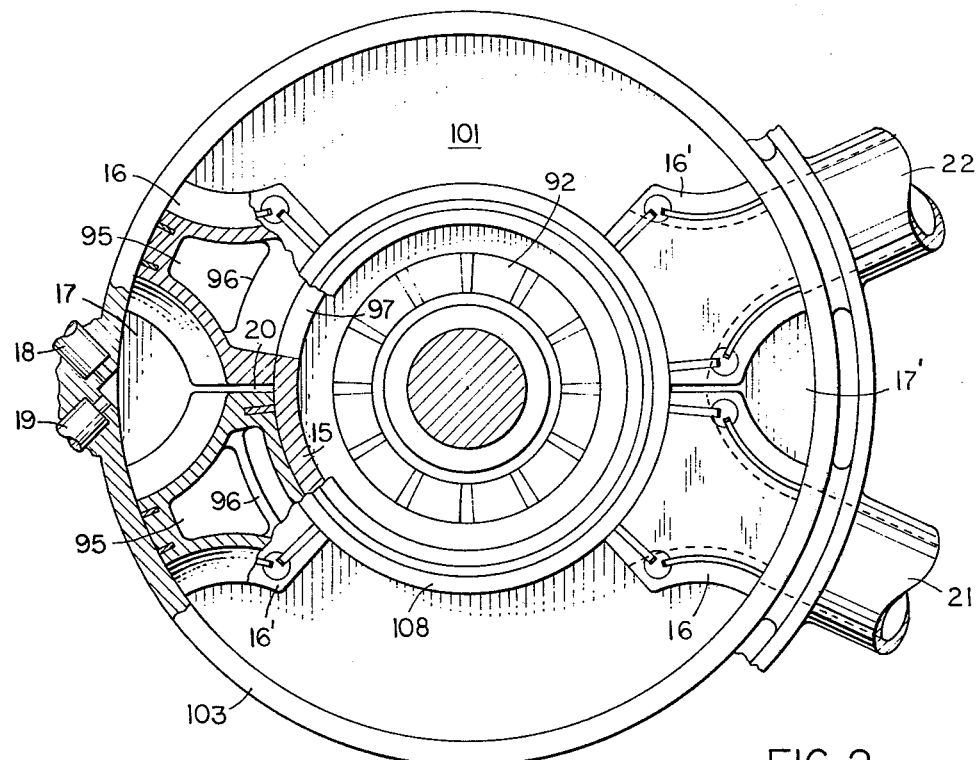
FIG. 2 is a front elevation of the dual rotor in the internal combustion engine configuration showing part of the housing and the dual rotor at the approximate instant of ignition.

The rotary engine in a basic configuration, embodies the following major elements: a dual rotor 11 located in a housing 12 and an oscillator 13 comprised of a cascade of elliptical gears. The dual rotor includes two hub halves 15 and 15'. A set of two vanes 16 is attached on hub half 15 and a similar set of two vanes 16' is attached on hub half 15'. The vanes are attached on the periphery of the hub halves diametrically opposite in such a manner that when the two hub halves are put together, the vanes from one hub half are interposed between the vanes of the other hub half, extending from one outer edge of the hub to the other outer edge of the hub. The vanes together with the hub halves form a constant width dual rotaor, the two hub halves rotating and oscillating with respect to each other about a common axis within the limits of the vanes, the vanes of one hub half moving freely over the periphery of the other hub half and the walls of the circular housing. The vanes 16 and 16' are shaped in such a manner that when rotated adjacent to each other they form a hemispheroidal combustion chamber 17, as best seen in FIG. 2, to obtain high thermal efficiency and minimize emissions. These advantages of a hemispheroidal combustion chamber are well known. The four peripheral corners of the vanes have a concave form to reduce the polar moment of inertia of the dual rotor. The concave corners may be eliminated, if desired, the adjacent sides of the two vanes extending the squish area 20 to the peripheral casing 103. FIG. 2 shows a front view of the dual rotor, injector 18 and ignitor 19 at the approximate time of ignition. At this instant, both rotor halves are rotating at equal angular velocities. In analogy with the reciprocating engine, this instant corresponds to the dead center. The location of the ignitor is such that at high engine speed with the ignition advanced, the ignition occurs at the approximate center of the combustion chamber 17 producing a rapid and efficient combustion, and at low engine speed with the ignition occuring later, the point of ignition is off the center of the combustion chamber producing a slower combustion and avoding engine roughness and noise.

Figure 4:
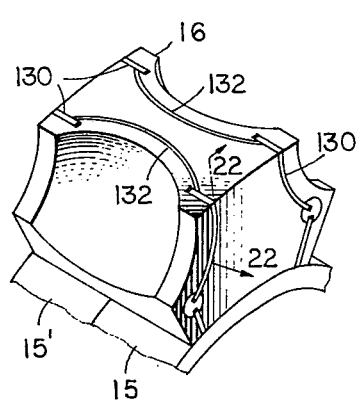
FIG. 4 is a perspective view of a vane.
Figure 3:
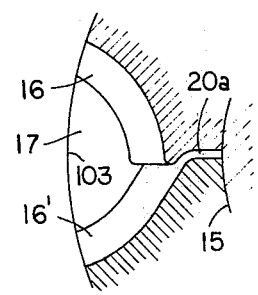
FIG. 3 is a diagrammatic sectional view of an alternate combustion chamber.

The squish area 20 between the adjacent vanes is used to create turbulence in the combustion chamber 17. The vanes may be shaped to form a curved squish area 20a, as shown in FIG. 3, creating a swirl-like turbulence in the combustion chamber. FIG. 4 is a perspective view of a single vane and part of the sealing system. For clarity of illustration, all internally protruding edges of the vane are shown in sharp lines, however, for best results the edges are rounded. The hub sealing system is not shown in FIG. 4.

The intake 21 and exhaust 22 ports are located on the periphery of the housing opposite the injection-ignition means and spaced apart to provide the required degree of communication of the intake and exhaust ports so that the scavenging chamber 17' can be purged of the remaining exhaust gases.

Figure 5:
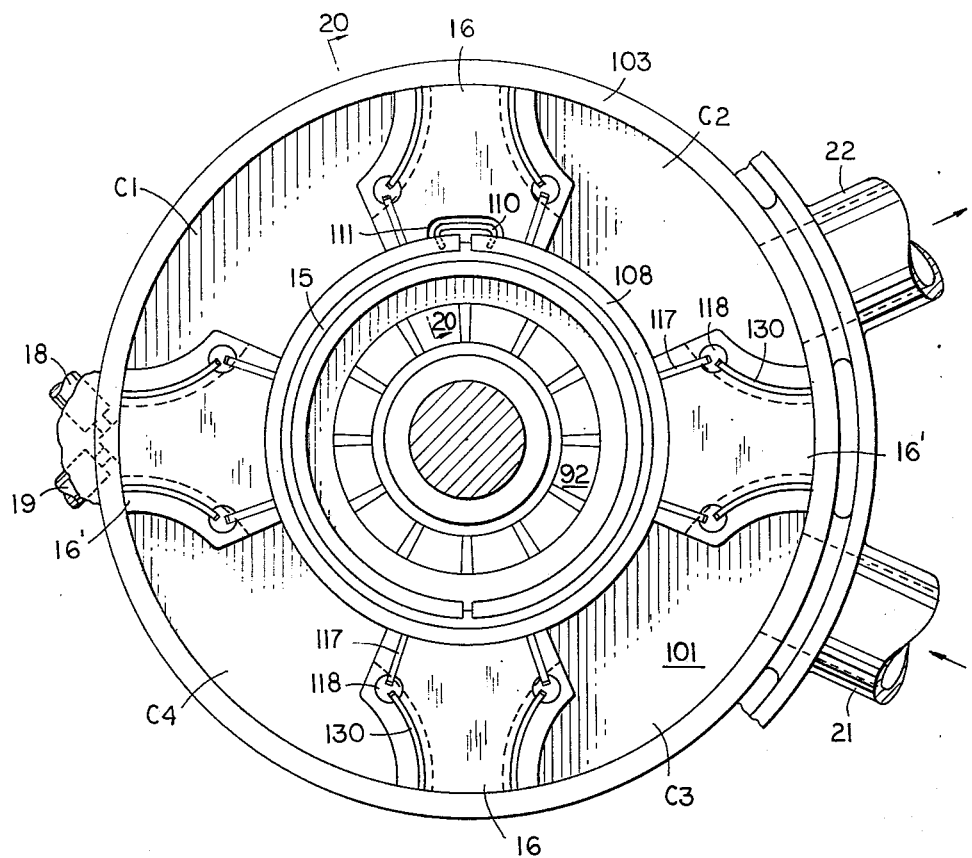
FIG. 5 is a view of the dual rotor and part of the housing looking along 5—5 of FIG. 1.

In FIG. 5 the dual rotor is shown in the middle of the four working strokes, the hub half 15 and vanes 16 rotating at highest velocity and hub half 15' (not visible) and vanes 16' rotating at lowest velocity. Chamber C1 is experiencing expansion, chamber C2 is experiencing exhaust, chamber C3 is experiencing intake and chamber C4 is experiencing compression. The four working strokes begin at the instant shown in FIG. 2, occuring simultaneously, effected by the mutual vane movement. When one set of vanes overtakes the other set, corresponding to the instant shown in FIG. 2, the stoke is completed and a new stroke begins.

Figure 1:
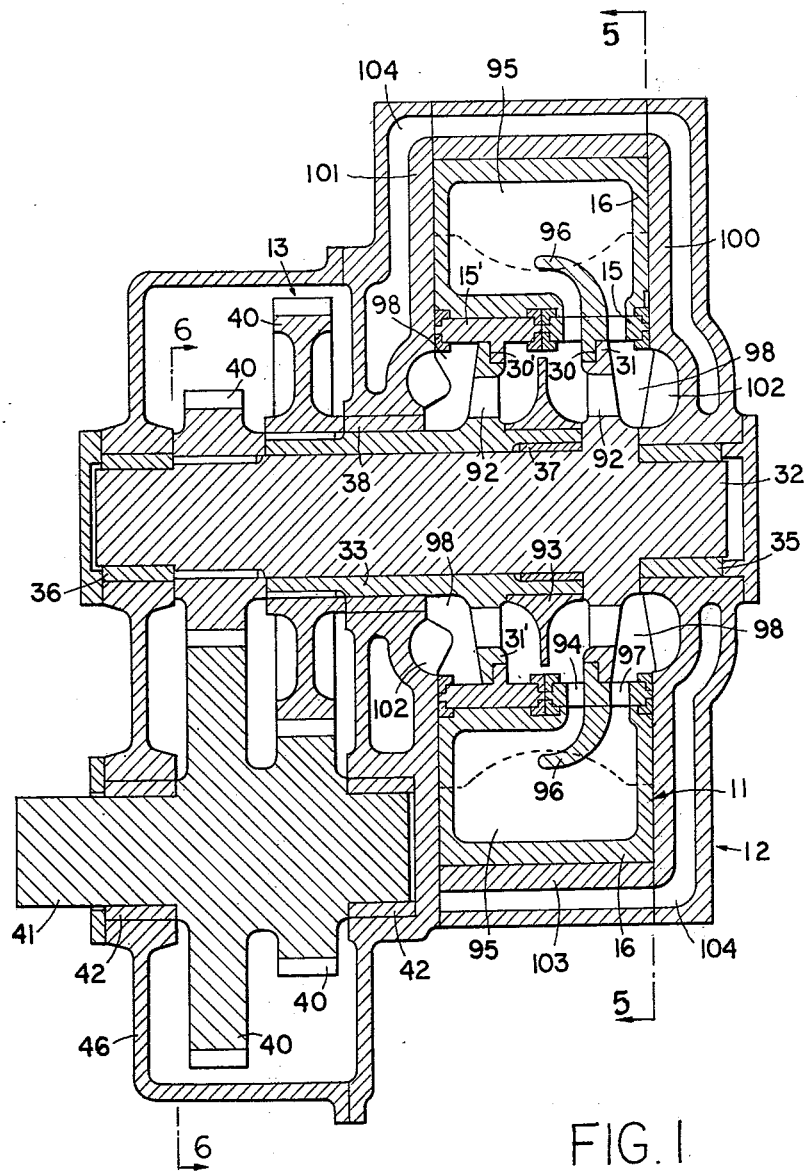
FIG. 1 is a longitudinal sectional view of the invention in an elementary, internal combustion engine configuration showing the major elements embodied in the invention.

Each half of the dual rotor, comprising a hub half and two vanes, is attached at 30 and 30' to discs 31 and 31', respectively, as shown in FIG. 1. Disc 31 is integral with rotor shaft 32 and disc 31' is integral with rotor shaft 33. Shaft 33 is hollow. Rotor shaft 32 is supported by bearings 35 and 36, and rotor shaft 33 is supported by bearings 37 and 38.

Shafts 32 and 33 interconnect the dual rotor 11 to the oscillator 13 comprised of a cascade of elliptical gears. To facilitate the description of the preferred embodiments identical gears with respect to pitch line and number of teeth will have the same reference numbers. It will be understood that the center parts of gears with the same reference numbers are adapted in each case to interconnect properly with the associated elements, such as shafts and journals.

Figure 6:
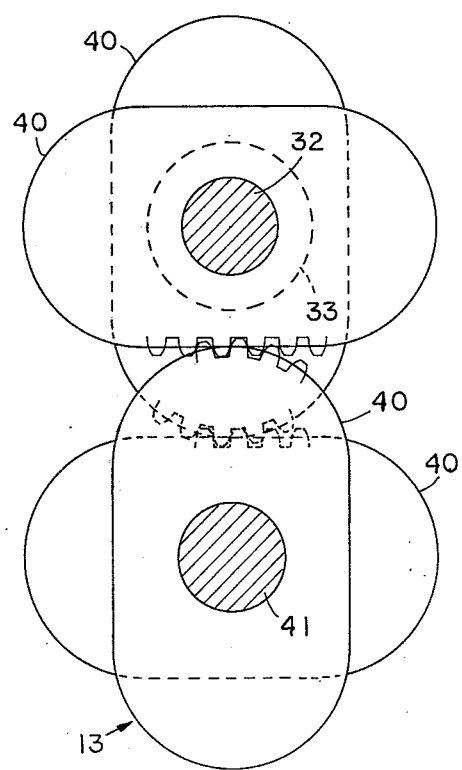
FIG. 6 is a diagrammatic view of the oscillator comprised of four two-lobe elliptical gears looking along 6—6 of FIG. 1.

The oscillator 13, shown in FIGS. 1 and 6, includes four two-lobe elliptical gears 40. Two of the gears are integrated wth a common output shaft 41 and are positioned angularly with respect to each other at 90°. Each of the other two elliptical gears is fastened at the end of one of the rotor shafts 32, 33 and engaged with one of the output shaft gears. The output shaft 41 runs on bearings 42. The oscillator superimposes rotating oscillations on the rotation of the dual rotor 11 so that both rotor halves will oscillate with respect to each other while rotating in the same direction, the output shaft 41 delivering a rotation with an angular velocity which is the average of the instantaneous angular velocities of the rotor halves. The elliptical gears on shafts 32 and 33 must have two lobes to obtain two oscillations per one revolution of the four vane dual rotor. The oscillator 13 is accommodated in housing 46. It will be noted that the gears 40 on shafts 32 and 33 must be made as light as possible to reduce the oscillating mass, but the gears 40 on output shaft 41 constitute a flywheel mass and therefore may be of solid construction. The polar moments of each half of the oscillatory system must be the same to eliminate torsional vibrations.

Figure 7:
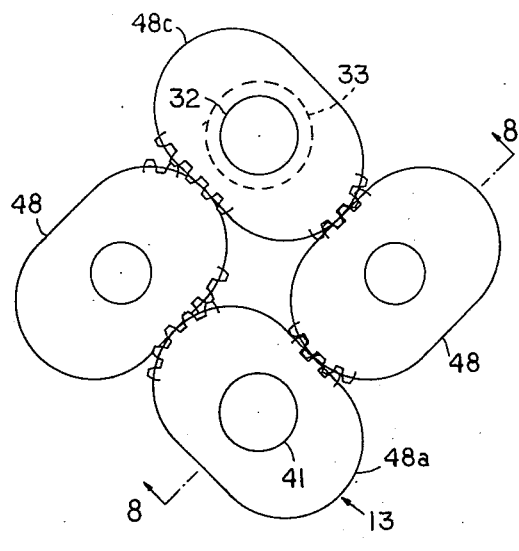
FIG. 7 is a diagrammatic view of an alternate oscillator comprised of six two-lobe elliptical gears.
Figure 8:
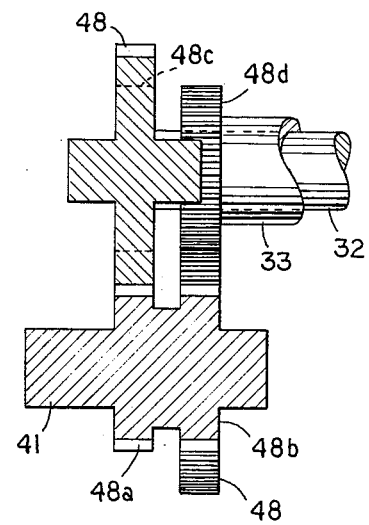
FIG. 8 is a view looking along 8—8 of FIG. 7.

Higher effective gear ratio and a distribution of the varying loads may be achieved by introducing additional pairs of elliptical gears in the cascade. Higher gear ratio will give a larger amplitude of oscillation analogous to longer stroke in a reciprocating engine. One such arrangement employing six two-lobe elliptical gears is shown in FIG. 7. Two of the gears 48a and 48b are integrated with a common output shaft 41 and are positioned angularly with respect to each other at zero angle. One gear 48c is fastened at the end of rotor shaft 32 and another gear 48d is fastened at the end of rotor shaft 33. The two remaining gears 48 are independent idler gears, each interconnecting the gear on one of the rotor shafts with one of the output shaft gears. Maximum gear ratio in a cascade is achieved by alternately engaging the major and minor radii of the elliptical gears. If an elliptical gear is engaged simultaneously at two of its major or two of its minor radii, the gear ratio is obviously one.

Figure 9:
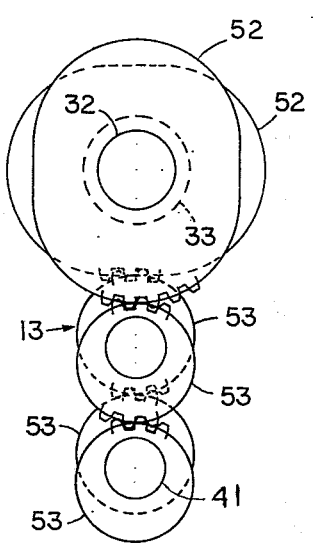
FIG. 9 is a diagrammatic view of an alternate oscillator comprised of two two-lobe and four single lobe elliptical gears.

An alternate configuration of the oscillator 13 may be obtained by combining two two-lobe elliptical gears 52 with two pairs of single lobe elliptical gears 53, shown in FIG. 9. Two of the gears 53 are integrated with a common output shaft 41 and are positioned angularly with respect to each other at 180° to reverse the direction of the cascade and give a zero phase angle. One of the two-lobe gears 52 is fastened at the end of rotor shaft 32 and the other gear 52 is fastened at the end of rotor shaft 33. The two remaining gears 53 are independent idler gears, each interconnecting one of the rotor shaft gears 52 with one of the output shaft gears 53. Output is obtained from shaft 41 rotating at twice the angular velocity of the dual rotor, the angular velocity of the dual rotor being the average instantaneous velocity of the rotor halves.

Figure 10:
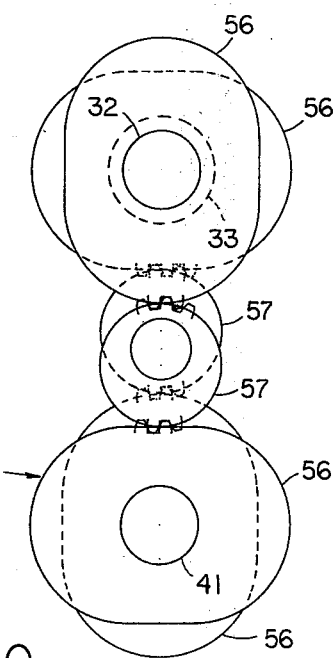
FIG. 10 is a diagrammatic view of an alternate oscillator comprised of four two-lobe and two single lobe elliptical gears.

An alternate configuration of the oscillator 13 may be obtained by combining four two-lobe elliptical gears 56 with a pair of single lobe elliptical gears 57, as shown in FIG. 10. Two of the gears 56 are integrated with a common output shaft 41 and are positioned angularly with respect to each other at 90°. One of the remaining two-lobe gears 56 is fastened at the end of rotor shaft 32 and the other gear 56 is fastened at the end of rotor shaft 33. The single lobe gears 57 are independent idler gears, each interconnecting one of the rotor shaft gears 56 with one of the output shaft gears 56. The output shaft 41 will rotate at the angular velocity of the dual rotor.

Figure 11:
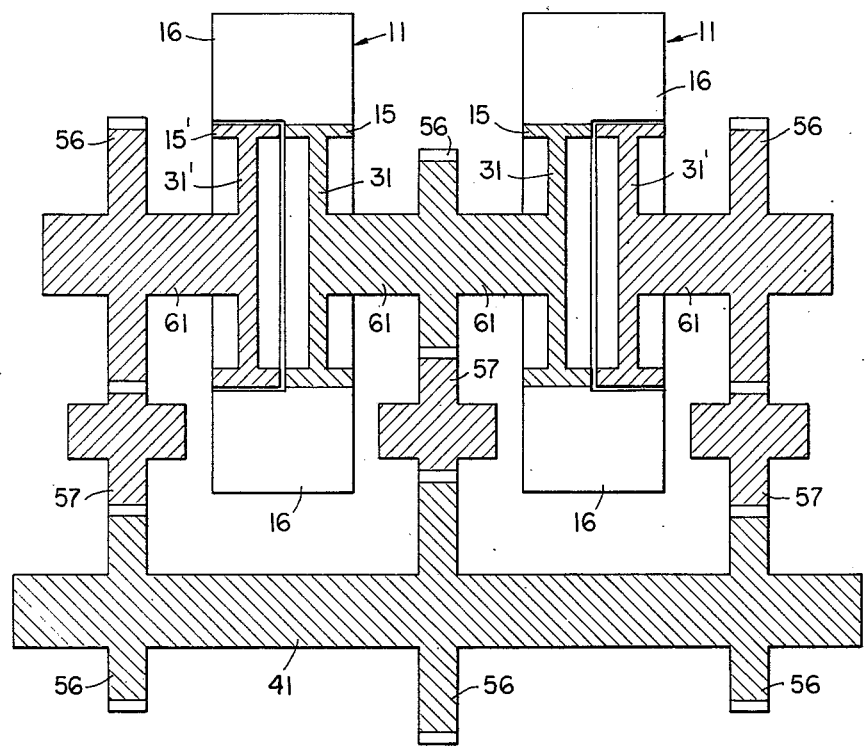
FIG. 11 is a diagrammatic longitudinal sectional view of an alternate arrangement of elements of the invention.

FIG. 11 shows a configuration employing the oscillator arrangement shown in FIG. 10. Shafts 32 and 33 are replaced by rotor shafts 61 extending axially outward on opposite sides of the dual rotor 11. The engaging gears 56, 57, 56 are located on opposite sides of the dual rotor and interconnected by a transverse output shaft 41. A multi-unit series arrangement is obtained by mounting a series of consolidated common gears 56 at locations between the individual units on an extended output shaft 41, successive gears being displaced angularly by 90° and interconnected by means of gears 57 and 56 to joined rotor shafts 61. Gears 57 and 56 of two adjoining units are consolidated into common gears 57 and 56, respectively. A parallel arrangement may be obtained by engaging mirror image units on the opposite side of output shaft 41.

Figure 12:
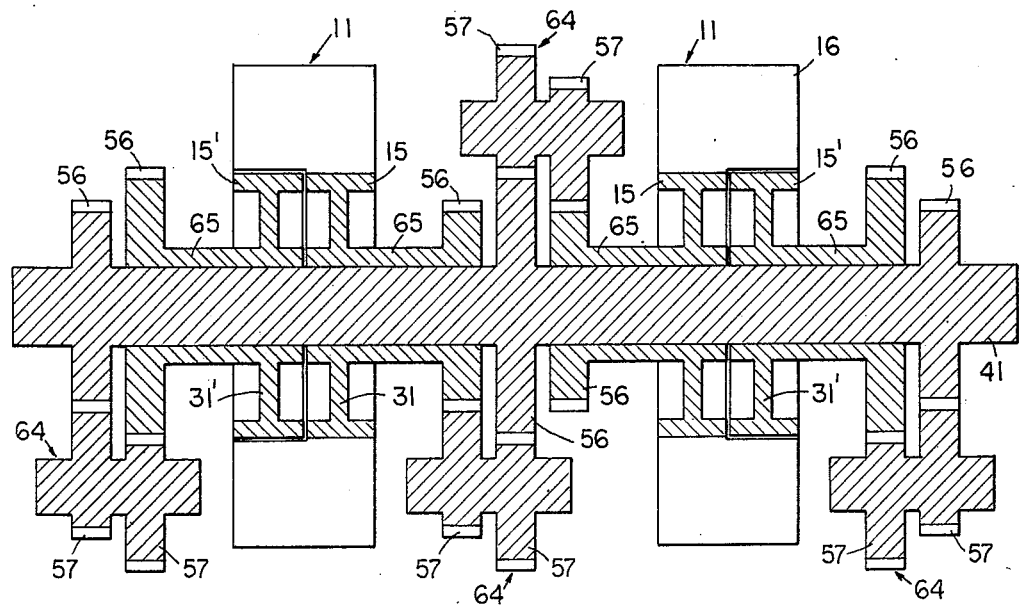
FIG. 12 is a diagrammatic longitudinal sectional view of another alternate arrangement of elements of the invention.
Figure 13:
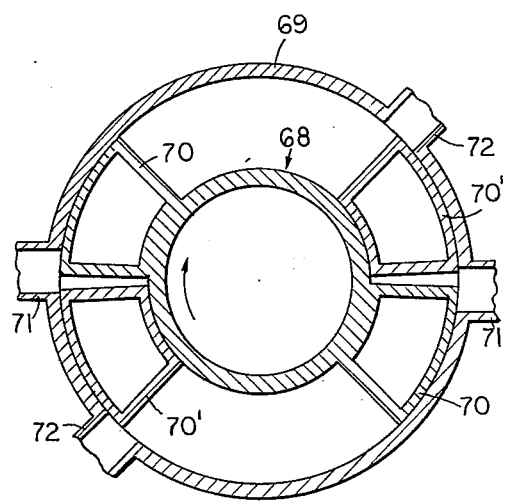
FIG. 13 is a diagrammatic sectional view of the dual rotor and housing in a steam engine configuration.

Another configuration which may be employed in multi-unit arrangements is shown in FIG. 12. The elliptical gears employed are the same as in FIG. 10, except that a single idler gear 57 is replaced by an integrated set 64 of two gears 57 positioned angularly at 180° with respect to each other to reverse the direction of the cascade and rotating about a stationary axis. Identical rotor shafts 65 are hollow, extending coaxially outward on opposite sides of the dual rotor 11 and accommodating a concentric output shaft 41 in the hollow middle. A multi-unit series arrangement is obtained by mounting a series of consolidated common gears 56 at locations between the individual units on an extended output shaft 41, successive gears being interconnected by means of sets 64 to the adjacent rotor shaft gears 56. Two sets 64 may interconnect two adjacent gears 56 and successive gears 56 on shaft 41 may be mounted at any feasible angle. The single lobe gear sets 64 may be replaced by two-lobe gear sets using elliptical gears 56 arranged in the same manner as gears 40 on shaft 41, shown in FIG. 1, The description hereinbefore deals with a four stroke cycle, but the invention is not limited to the described application. By suitable shaping of the vanes, arrangement of ports and other peripheral means, this invention may be used in other applications. One such application is the external combustion engine such as steam engine employing a two stroke cycle, as shown in FIG. 13. A four vane dual rotor 68 is rotating in housing 69, the vanes 70 and 71' being of simple box-like structure without cooling provisions. A pair of diametrically opposite vanes 70 and another pair of diametrically opposite vanes 70' are located on two hub halves, respectively, in a similar manner as for the internal combustion engine described herein. The engine in FIG. 13 is shown in the process of steam admission and exhaust corresponding to a dead center also shown in FIG. 2. Intake ports 71 are disposed equidistantly on the housing 69 in the vicinity between the two adjacent vanes 70 and 70' at the instant of the dead center. Exhaust ports 72 are disposed at an angular distance from the intake ports 71 giving the required degree of compression between the exhaust and admission of steam. Any of the oscillators shown in FIGS. 1, 6, 7, 8, 9 and 10 may be used in combination with the configuration shown in FIG. 13. It will be noted that, because the working strokes occur at angular equidistant intervals, the bearings experience no loads due to the working pressures. Other advantages include simplicity, elimination of valves, small size, and reduced initial condensation losses due to the fact that admission and exhaust of steam occur at different parts of the engine. The engine has eight single chamber expansion strokes per revolution and therefore is equivalent to a four cylinder double-acting reciprocating engine.

By suitable arrangement of the intake and exhaust ports, and using the designated output shaft as an input shaft the invention may be used as a pump, compressor or fluid motor.

Figure 14:
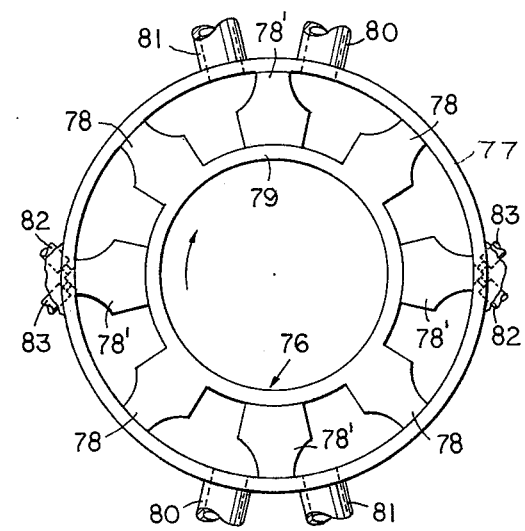
FIG. 14 is a diagrammatic view of a dual rotor and housing in an eight vane configuration.

The dual rotor 76 and part of the housing 77 of an eight vane internal combustion engine is shown in FIG. 14. Four vanes 78 are attached on hub half 79 and a similar set of four vanes 78' are attached on hub half 79' in the same manner as in the four vane case described hereinbefore. The vanes, in FIG. 14, are shown in the middle of the four working strokes, the hub half 79 and vanes 78 rotating at their highest velocity and the hub half 79' and vanes 78' rotating at their lowest velocity. This instant is equivalent to the one shown in FIG. 5. The intake ports 80 and exhaust ports 81 are located diametrically opposite, as are the injectors 82 and ignitors 83.

Figure 15:
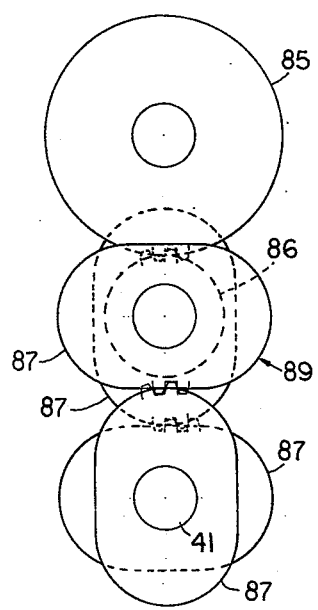
FIG. 15 is a diagrammatic view of an oscillator for the engine shown in FIG. 14.
Figure 16:
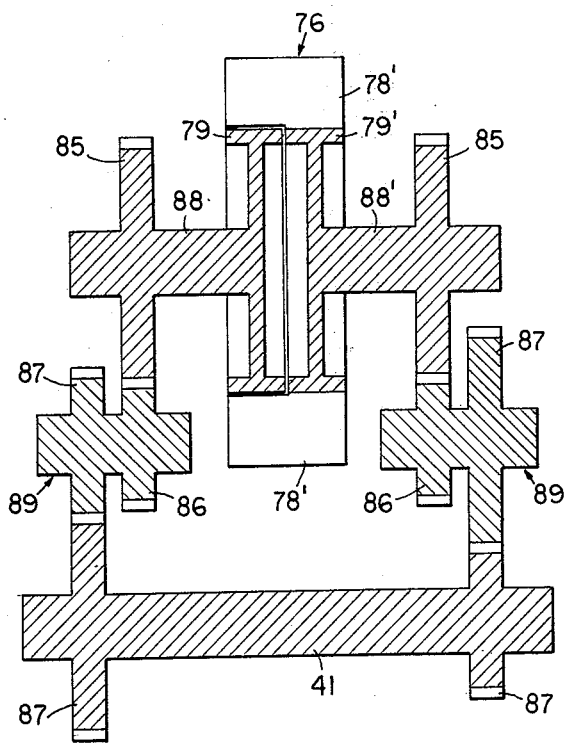
FIG. 16 is a diagrammatic longitudinal sectional view of an arrangement of the elements of FIGS. 14 and 15.

FIG. 15 shows the oscillator arrangement for an eight vane machine, the oscillator being comprised of two circular gears 85, two circular gears 86 and four two-lobe elliptical gears 87. Two of the gears 87 are integrated with a common output shaft 41 and are positioned angularly with respect to each other at 90°. One of the circular gears 85 is fastened on rotor shaft 88 and the other gear 85 is fastened on rotor shaft 88'. Each of the circular gears 85 is engaged with one of the gears 86, the gears 85 being externally toothed and having twice the pitch diameter of gears 86. The oscillator has two gear sets 89, each set comprised of a circular gear 86 and one of the elliptical gears 87, the elliptical gear being engaged with one of the elliptical gears 87 of the output shaft 41 and the gear sets 89 rotating about stationary axes. The output shaft 41 rotates at twice the angular velocity of the dual rotor. Generally, the product of the ratio of the circular gears and the number of lobes of the elliptical gear on gear sets 89 will give the number of oscillations of the dual rotor per revolution, which must be equal to half the number of vanes. A configuration employing the described oscillator arrangement is shown in FIG. 16. The gears are interconnected by a transverse output shaft 41. Multi-unit arrangements may be obtained by the same method shown in FIG. 11.

Another configuration of the machine employing the same gears as shown in FIG. 15 is shown in FIG. 17. The rotor shafts 90 and 90' are hollow and accommodate a concentric output shaft 41. A multi-unit series arrangement may be obtained by the same method shown in FIG. 12.

Theoretically, the four oscillations per revolution of the dual rotor, as required in the configuration shown in FIG. 14, may be obtained by employing four-lobe elliptical gears on the rotor shafts and single and/or multi-lobe elliptical gears completing the cascade. However, such arrangements do not have practical value in the present application, because the obtainable maximum gear ratio decreases rapidly with an increasing number of lobes. For example, the practical maximum gear ratio for a four-lobe elliptical gear is about 1:2.

It is possible to replace the elliptical gears in this invention by generally non-circular gears. Such non-circular gears can have any continuous analytically or empirically determined pitch line. However, by necessity the pitch line cannot deviate substantially from the ellipse, and elliptical gears are the preferred embodiment.

The motion of elliptical gears as applied to this invention is explained by means of FIGS. 18 and 19. Because any elliptical gearing can be simulated by the motion of simple ellipses, the two meshed elliptical gears shown in FIGS. 18 and 19 represent a cascade of single and multi-lobe elliptical gears comprising an oscillator. Two identical elliptical gears are mounted on shafts at foci $F_1$ and $F_2$ and are shown in FIG. 18 at the instant when the meshed radii $r_1$ and $r_2$ are of equal length, both gears rotating at the same angular velocity. In analogy with the reciprocating engine, this instant, also shown in FIG. 2, corresponds to a dead center. The angular positions $\alpha$ and $\beta$ of the gears, at this instant, are defined by the following relationships: $\tan \alpha = b/e$ and $\beta = 180° - \alpha$, where b is the semiminor axis and e is the linear eccentricity. FIG. 19 shows the elliptical gears at maximum gear ratio, the gear rotating about $F_1$ at minimum velocity and the gear about $F_2$ at maximum velocity. This instant corresponds to the same shown in FIG. 5. If the two elliptical gears representing the oscillator make n revolutions per one revolution of the dual rotor, the angular distance between the center lines of vanes 16 and 16' forming the combustion chamber at the instant shown in FIG. 2, will be $2\alpha/n$. or the angular distance between two non-adjacent vanes will be $z\beta n$. If the output shaft 41 rotates at a constant angular velocity, the instant shown in FIG. 18 corresponds to maximum inertial loads on the machine and the instant shown in FIG. 19 to zero inertial loads.

The internal cooling of the dual rotor 11 is accomplished by circulating air through the hollow vanes 16, 16' and the central chamber 98 by means of two axial fans 92 which form part of the discs 31 and 31'. The air, after leaving the axial fans, is deflected by baffle 93, cools the hub halves 15 and 15' and enters through the inlet openings 94 in the hub halves the internal cavity 95 of the vanes 16 and 16'. The air is deflected inside the vanes by ribs 96 and exits the cavity through the outlet openings 97 into the central chamber 98. To improve heat transfer, the central parts of the axially spaced end walls 100 and 101 are equipped internally with a plurality of fins 102, the central parts of the end walls having an extended axial spacing therebetween and the end walls being interconnected by the peripheral casing 103. All three elements 100, 101 and 13 of housing 12 are cooled externally by coolant passages 104. The baffle 93 is located between the fans 92 and is free to rotate on rotor shaft 33.

The sealing of the working chambers with respect to the hub halves 15 and 15' is accomplished by four split angle section rings 108 accommodated into corresponding grooves in the hub halves and loaded by circular springs 109, as shown in FIG. 20. Each pair of rings 108 is mounted on one of the hub halves and rotates with it. The rings are noncircular in the free state and when expanded on the hub halves, become round developing the required contact pressure to counteract centrifugal forces and seal the working chambers. Additional tension in the rings may be provided by end springs 110 inserted into holes in the rings on opposite sides of the split located in the middle of one of the associated vanes, the end springs being accommodated in recesses 111 to prevent the rings 108 from moving. Combustion, expansion and compression pressure may be applied to the exposed sides of rings 108 to provide positive sealing during the respective strokes.

The sealing of the lower part of the vanes is accomplished as follows. A static wedge seal 115 seals the space between the vanes 16 or 16' and the ring 108 by means of spring 116 which also exerts pressure on a wedge seal 117 pressing against end wall 100 or 101. Spring 116 and seal 117 fit into a groove of sealing pin 118 which is pressed against end wall 100 or 101 by means of spring 119. Another static seal 120, located in the middle of the hub, has a static contact with a carrier seal 121 which is adjoined by a wedge seal 117 at one of the end walls. All three seals 117, 120 and 121 are held in place by a suitably adapted spring 122. The carrier seal 121 seals the top surfaces of rings 108 and is shaped to accommodate a hub seal 123 and a corner seal 124. Seals 123 and 124 seal the hub half surface and the sides of rings 108. and are being held in place by spring 125. Springs 122 and 125 must be of sufficient strength to counteract centrifugal forces and to provide adequate sealing during the intake stroke. Combustion, expansion and compression pressure may be applied by means of holes 126 in the walls of the vanes 16 and 16', on the tops of the subjected seals to effect positive sealing during the expansion and compression strokes.

The remaining periphery of the vanes 16 and 16' is sealed by side strips 130 accommodated in grooves in the walls of the vanes and pressed against the end walls 100 and 101 by srings 131. Strips 130 fit into suitable grooves in the sealing pins 118 and are sealing the corner between the vanes and the peripheral casing 103 by centrifugal force and springs 131. The remaining space between the vanes and the peripheral casing is sealed by peripheral seals 132 which are held in place by springs 133. Centrifugal force is the main sealing force for strip seals 132 which are contoured to effect a tight fit with side strips 130 and the peripheral casing 103.

Seals 135 aided by springs 109 are provided for sealing the inner hub space from the working chambers and may be used as oil seals.

An alternate sealing system for the hub halves 15 and 15°, and the lower part of the vanes 16 and 16' is shown in FIG. 23. The rotor shafts and bearings are axially dimensioned to allow the butting of the hub halves 15 and 15' against each other. Split generally triangular section sealing rings 140, 141 and springs 142 press the two hub halves together sealing the contact areas. Sealing rings 140, 141 and spring 142 also seal the space between hub half 15 and end wall 100, and the space between hub half 15' and end wall 101. Although the cooling fans 92 facilitate a rapid heat exchange and therefore equalization of temperatures, split secondary sealing rings 143, 144 and springs 145 may be provided to assure effective sealing under all operating conditions. Sealing rings 143 and 144 have a generally triangular section being of similar costruction as rings 140 and 141 and are of relatively shallow depth to be able to adjust to the contacting surfaces. The splits in the rings are preferably located 180° apart in favorable areas with respect to working pressures and prevented from rotating. Angle seal 146 seals the space between the lower part of a vane, the corresponding moving hub half and the end wall, and is aided by a suitable spring 147. One corner of seal 146 may have a bevel 148 to provide for wear so that the contacting length of seal 146 with the corresponding hub half surface stays the same. Corner seal 149, aided by spring 150, forms a static contact with the hub half and a sliding contact with an end wall. Seals 146 and 149 may be aided in sealing by holes 126 are explained hereinbefore.

For this sealing system, the fans 92 are designed to effect an air movement in the opposite direction of the one described hereinbefore, creating a pressure condition that forces the two hub halves together.

The outer diameter of the grooves in end walls 100 and 101 which accommodate the sealing rings 140 and 141 is somewhat smaller than the outer diameter of the hub halves 15 and 15' to accommodate manufacturing tolerances. The difference in the diameters as shown in FIG. 23 is exaggerated for clarity of illustration.

It will be noted that although the seals are subject to varying angular acceleration and deceleration, the sealed surfaces are either flat or circular, the seals always maintain a right angle with the surface and are not subject to a reversal of the direction of motion as in reciprocating machines or a reversal of the direction of the centrifugal force as in most eccentric rotor type machines.

Although the invention has been described above in the preferred embodiments, it will be understood by those skilled in the art that modifications may be made within the spirit of the invention. It is intended that no limitations be placed on the invention except as defined by the scope of the appended claims.

I claim:

1. An internal combustion rotary engine comprising: a circular housing having axially spaced end walls, a peripheral casing interconnecting said end walls, and at least one intake port and at least one exhaust port, said ports being arranged on the peripheral casing; a pair of rotor halves disposed coaxially within said circular housing, each rotor half having N vanes, N being an even number and the vanes of one rotor half being interposed between the vanes of the other; oscillator means interconnected with said rotor halves for superimposing rotatory oscillations thereon whereby the rotor halves oscillate with respect to each other while rotating in the same direction; a pair of said vanes, the vanes being from alternate rotor halves, periodically defining together with said peripheral casing a hemispheroidal combustion chamber and a squish area, and another pair of said vanes, the vanes being from alternate rotor halves, periodically defining together with said peripheral casing a hemispheroidal scavening chamber, the scavenging chamber communicating with said intake port and said exhaust port.

2. The rotary engine of claim 1, wherein said squish area is curved.

3. The rotary engine of claim 1, wherein said vanes have concave peripheral corners.

4. In a rotary machine having a circular housing with axially spaced end walls, a pair of rotor halves disposed coaxially for rotation and rotatory oscillation relative to each other within said housing, each rotor half having a hub half with a number of vanes thereon and a rotor shaft extending coaxially within said housing, and means for establishing heat transfer and circulation within said housing, said means comprising: a plurality of internal fins disposed on axially extended central parts of said end walls; said central parts and said hub halves together with the internal portions of said rotor shafts defining a central chamber; said vanes being hollow, each vane being provided with an internal rib and the cavity of each vane communicating with the central chamber by means of inlet-outlet openings in its associated hub half; said rotor halves further including circulation means on said rotor halves for rotation therewith inside said circular housing to establish internal circulation through said central chamber and said cavities utilizing said inlet-outlet openings.

5. The rotary engine of claim 4, wherein there is a baffle positioned inside said central chamber.

6. The rotary engine of claim 1, wherein said oscillator means comprises a pair of multi-lobe gears respectively coupled to said rotor halves for rotation and oscillation therewith, the number of lobes on each of said multi-lobe gears being equal to said N; a pair of lobed gears carried by an output shaft and being equal to each other with respect to number of lobes, said lobed gears respectively being engaged with said multi-lobe gears.

7. In a rotary machine constituting a unit, a circular housing, a pair of rotor halves disposed coaxially within said housing, each rotor half having N vanes, N being an integer number, and oscillator means for superimposing rotatory oscillations on said rotor halves whereby the rotor halves oscillate with respect to each other while rotating in the same direction, said oscillator means comprising: a first multi-lobe gear and a second multi-lobe gear respectively coupled to said rotor halves for rotation and oscillation therewith, the number of lobes on each of said multi-lobe gears being equal to said N; a first lobed gear and a second lobed gear, said lobed gears being carried by an input-output shaft and being equal to each other with respect to number of lobes; a first idler gear and a second idler gear, said idler gears being equal to each other with respect to number of lobes and each of said idler gears having a major radius and a minor radius, said first idler gear being engaged with said first multi-lobe gear and with said first lobed gear, and said second idler gear being engaged with said second multi-lobe gear and with second lobed gear, each of said idler gears being engaged with its associated multi-lobe and lobed gear simultaneously at its major and minor radius for maximum gear ratio.

8. In a rotary machine cotituting a unit, a circular housing, a pair of rotor halves disposed coaxially within said housing, each rotor half having N vanes, N being an integer number, and oscillator means for superimposing rotatory oscillations on said rotor halves whereby the rotor halves oscillate with respect to each other while rotating in the same direction, said oscillator means comprising: a first multi-lobe gear and a second multi-lobe gear respectively coupled to said rotor halves for rotation and oscillation therewith, the number of lobes on each of said multi-lobe gears being equal to said N; a first set gear and a second set gear, said first set gear being engaged with said first multi-lobe gear, and said second set gear being engaged with said second multi-lobe gear; a third set gear and a fourth set gear, said first set gear being coupled to said third set gear to form a unitary gear set for rotation about a stationary axis, and said second set gear being coupled to said fourth set gear to form another unitary gear set for rotation about another stationary axis; a first lobed gear and a second lobed gear, said lobed gears being carried by an input-output shaft and being equal to each other with respect to number of lobes, the input-output shaft being coaxial with said rotor halves, said first lobed gear being engaged with said third set gear and said second lobed gear being engaged with said fourth set gear.

9. In a rotary machine, a circular housing, a pair of rotor halves disposed coaxially within said housing, each rotor half having P vanes, P being an integer number, and oscillator means for superimposing rotatory oscillations on said rotor halves whereby the rotor halves oscillate with respect to each other while rotating in the same direction, said oscillator means comprising: a first circular gear and a second circular gear respectively coupled to said rotor halves for rotation and oscillation therewith, said first and second circular gears being externally toothed; a third circular gear and a fourth circular gear, said first circular gear being engaged with said third circular gear and said second circular gear being engaged with said fourth circular gear, the gear ratio of each engagement being an integer number M; a first lobed gear and a second lobed gear, each of said lobed gears having N lobes, N being an integer number, said third circular gear being coupled to said first lobed gear to form a unitary gear set for rotation about a stationary axis, and said fourth circular gear being coupled to said second lobed gear to form another unitary gear set for rotation about another stationary axis, the product of M and N being equal to P; a third lobed gear and a fourth lobed gear, said third and fourth lobed gears being carried by an input-output shaft and being equal to each other with respect to number of lobes, said first lobed gear being engaged with said third lobed gear, and said second lobed gear being engaged with said fourth lobed gear.

10. The rotary machine of claim 7, wherein said gears are disposed on one side of said circular housing.

11. The rotary machine of claim 7, wherein said first gears are disposed on one side of said circular housing and said second gears are disposed on the other side of said circular housing.

12. The rotary machine of claim 11, wherein one said unit is joined to another said unit, the units being axially spaced from each other, the rotor halves of all the units and the multi-lobe gears of all the units being disposed coaxially, two of the multi-lobe gears from two adjoining units and two of the lobed gears from two adjoining units being consolidated into one common multi-lobe gear and one common lobed gear, respectively.

13. The rotary machine of claim 8, wherein one said unit is joined to another said unit, the units being axially spaced from each other; the rotor halves of all the units, the multi-lobe gears of all the units and the lobed gears of all the units being disposed coaxially and two of the lobed gears from two adjoining units being consolidated into one common lobed gear.

14. In a rotary machine having a circular housing with axially spaced end walls and a peripheral casing, a pair of rotor halves disposed coaxially for rotation and rotatory oscillation relative to each other within said housing, each of the rotor halves having a hub half with a number of vanes thereon and defining with the housing a plurality of variable volume working chambers, and means for sealing said working chambers, said means comprising: peripheral seals and side strip seals respectively disposed in the top and sides of said vanes, one end of each of the side strip seals being in sealing engagement with its associated peripheral seal; sealing pins disposed in the sides of said vanes, the other end of each of the side strip seals being in sealing engagement with its associated sealing pin; wedge seals disposed in the sides of said vanes with one end of each of the wedge seals being in sealing engagement with its associated sealing pin; static wedge seals in one side of each of said vanes, each of said static wedge seals being in sealing engagement with its associated wedge seal; carrier seals disposed in the other side of each of said vanes, one end of each of the carrier seals being in sealing engagement with its associated wedge seal; static seals disposed in the middle of said vanes, each of said static seals being in sealing engagement with the other end of its associated carrier seal; hub seals respectively disposed within said carrier seals; corner seals respectively disposed within said carrier seals, each of said corner seals being in sealing engagement with its associated hub seal; four angle section rings coaxially disposed on said hub halves, two of said rings being in sealing contact with their associated end walls, the other two of said rings being in sealing contact with each other; said seals, sealing pins and rings being spring loaded to ensure sealing contact with the peripheral casing, end walls and hub halves of the working chambers.

15. In a rotary machine having a circular housing with axially spaced end walls and a peripheral casing, a pair of rotor halves disposed coaxially for rotation and rotatory oscillation relative to each other within said housing, each of the rotor halves having a hub half with a number of vanes thereon and defining with the housing a plurality of variable volume working chambers, and means for sealing said working chambers, said means comprising: peripheral seals and side strip seals respectively disposed in the top and sides of said vanes, one end of each of the side strip seals being in sealing engagement with its associated peripheral seal; sealing pins disposed in the sides of said vanes, the other end of each of the side strip seals being in sealing engagement with its associated sealing pin; corner seals disposed in one side of each of said vanes with one end of each of the corner seals being in sealing engagement with its associated sealing pin; angle seals disposed in the other side of each of said vanes, each of said angle seals being in sealing engagement with its associated sealing pin; and said seals and sealing pins being spring loaded to ensure sealing contact with the peripheral casing, end walls and hub halves of the working chambers; at least two pairs of generally triangular section rings disposed in sealing engagement with the ends of said hub halves, said rings being split and the pairs of rings being spring loaded to ensure sealing contact with the hub halves and end walls of the working chambes, and between the hub halves of the working chambers.

16. The rotary machine of claim 4, wherein said circulation means comprises at least one fan.

* * * * *